United States Patent [19]
Coral et al.

[11] Patent Number: 5,738,148
[45] Date of Patent: Apr. 14, 1998

[54] UNIVERSAL CONNECTOR HOSE FOR JOINING AN EXTRACTOR TO AN ELEMENT FOR EXTRACTING FUMES FROM A FACTORY WORKPLACE

[75] Inventors: Nevio Coral; Luciano Coral; Claudio Coral, all of Leini, Italy

[73] Assignee: Coral S.p.A., Leini, Italy

[21] Appl. No.: 669,918

[22] Filed: Jun. 25, 1996

[30] Foreign Application Priority Data

Jun. 27, 1995 [IT] Italy ................... TO950146 U

[51] Int. Cl.$^6$ ............... F16L 11/00; B08B 15/04
[52] U.S. Cl. ............... 138/120; 138/118; 138/107; 454/64; 454/63
[58] Field of Search ............... 138/120, 107, 138/118; 454/65, 63, 67, 64; 285/168, 302, 165

[56] References Cited

U.S. PATENT DOCUMENTS

| | | |
|---|---|---|
| 3,818,817 | 6/1974 | Nederman. |
| 4,158,462 | 6/1979 | Coral ................... 454/63 X |
| 4,446,861 | 5/1984 | Tada ................... 454/63 X |
| 4,541,327 | 9/1985 | Lundstrom ................... 454/63 |
| 4,860,644 | 8/1989 | Kohl et al. ................... 454/65 |
| 5,159,737 | 11/1992 | Kimura et al. ................... 454/63 X |
| 5,336,130 | 8/1994 | Ray ................... 454/65 |
| 5,427,569 | 6/1995 | Plymoth ................... 454/65 |
| 5,482,505 | 1/1996 | Hedlund ................... 454/65 |
| 5,536,206 | 7/1996 | Bodmer et al. ................... 454/65 |

FOREIGN PATENT DOCUMENTS

| | | |
|---|---|---|
| 0 459 249 | 12/1991 | European Pat. Off. . |
| 0 058 119 | 8/1992 | European Pat. Off. . |
| 3225953 | 1/1984 | Germany ................... 454/63 |
| 44 24 559 | 1/1995 | Germany . |
| WO90/07991 | 7/1990 | WIPO . |
| WO93/04791 | 3/1993 | WIPO . |

*Primary Examiner*—Patrick F. Brinson
*Attorney, Agent, or Firm*—Finnegan, Henderson, Farabow, Garrett & Dunner, L.L.P.

[57] ABSTRACT

The hose comprises two flexible portions connected respectively to the suction unit and to the fume-conveyor element or hood, and a rectilinear portion which is articulated to the suction unit and the hood. The rectilinear portion comprises two rigid tubes between which is disposed an extensible bellows-type tube. Rigid tubes are held co-axial by a pair of rectilinear guides fixed to one of the rigid tubes and slidably engaging on a pair of fixed slides on the other rigid tube. The two rigid tubes are, finally, connected by a tension spring the action of which is braked by two friction disks disposed between the guides and the slides.

12 Claims, 1 Drawing Sheet

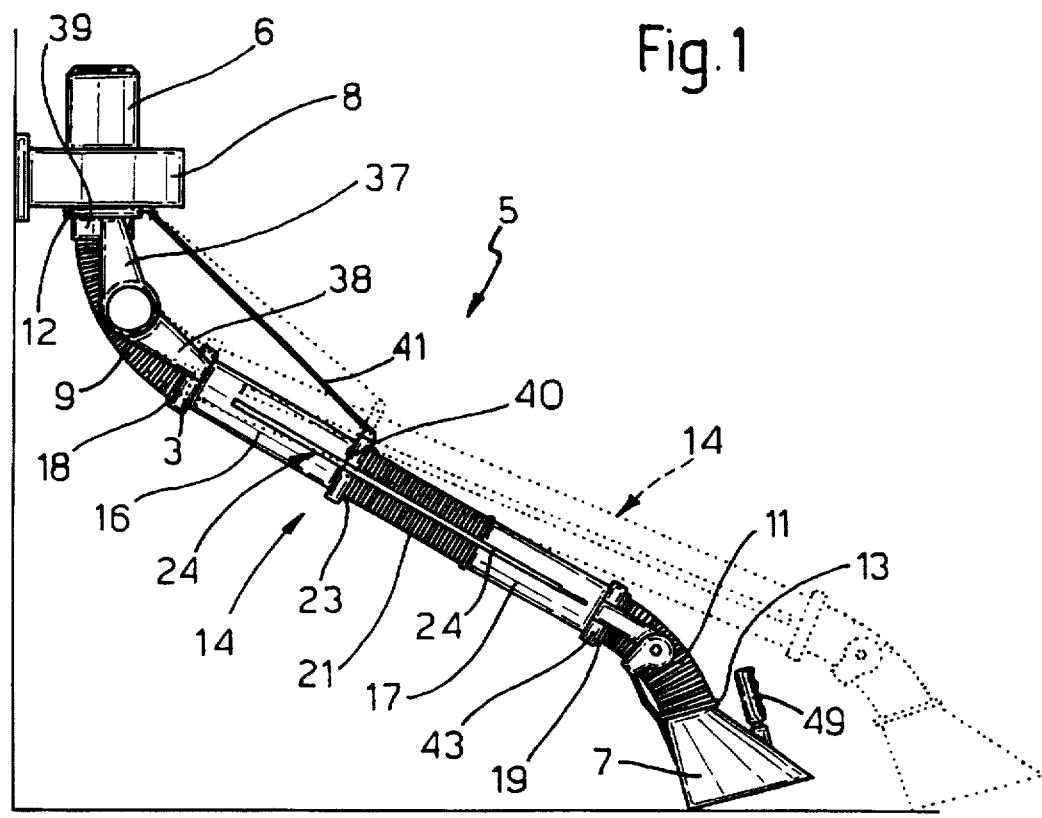
Fig. 1
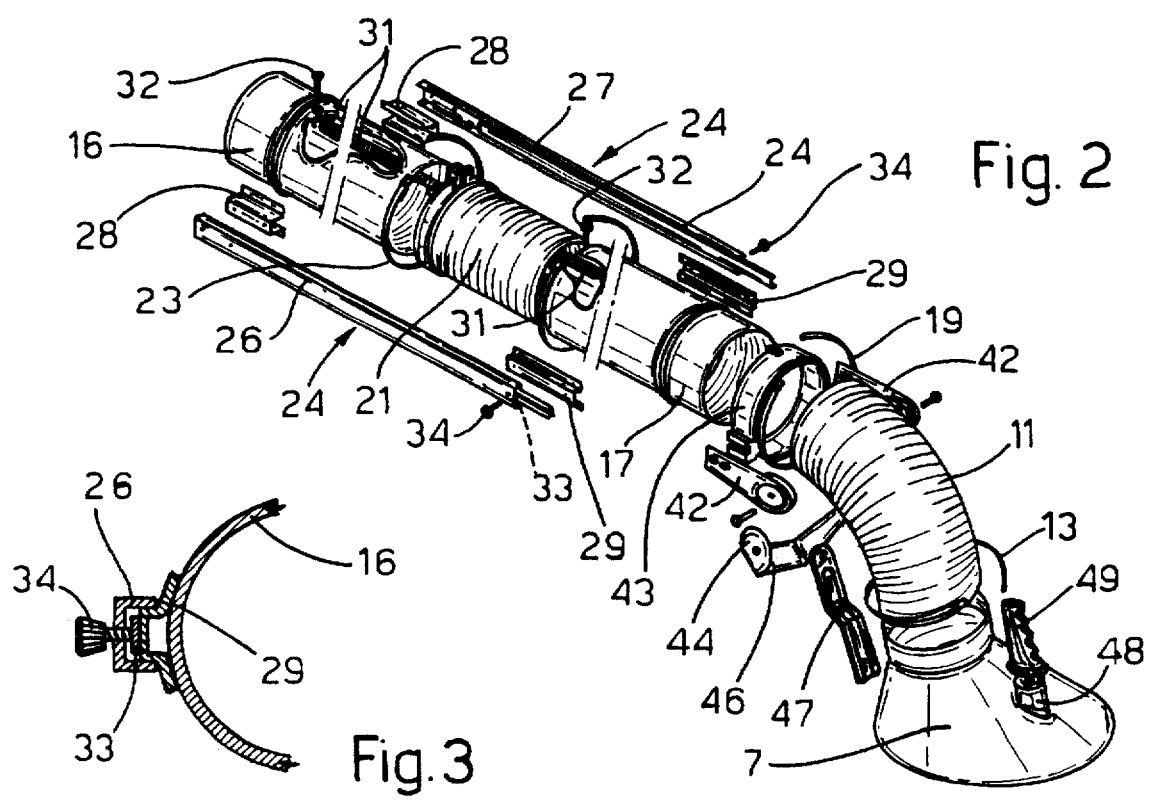
Fig. 2
Fig. 3

5,738,148

UNIVERSAL CONNECTOR HOSE FOR JOINING AN EXTRACTOR TO AN ELEMENT FOR EXTRACTING FUMES FROM A FACTORY WORKPLACE

BACKGROUND OF THE INVENTION

The present invention relates to a universal connector hose for joining an extractor to an element for extracting fumes from a factory workplace.

Many factories use machines or equipment, in welding for example, which create unhealthy gases, fumes or vapours which must immediately be extracted from the building. The prior art provides hoses with flexible portions which can be connected to a suction unit in such a way that the fume-guide element, or hood, can be placed directly above the source of the fumes.

One known connector hose is rotatably connected to a suction unit support and includes two flexible portions, connected to the suction unit and the hood respectively, and a straight portion arranged between the two flexible portions and articulated to the suction unit and the hood.

This hose has the disadvantage of having a straight portion which is rigid and of predetermined length, which means that the hood can only be positioned correctly in positions at a predetermined distance from the axis of the suction unit. In order to reach other positions it is therefore necessary to bend the two flexible portions to a greater or lesser extent, thereby tilting the hood and allowing some of the fumes to disperse into the surrounding environment. In order to overcome this disadvantage, the hose leading to the hood needs to be made to a specific length for each application, meaning that such extractor equipment generally very expensive.

SUMMARY OF THE INVENTION

The object of the invention is to provide a connector hose for connecting a suction unit to a fume-guide element, which is both simple and economical and eliminates the disadvantage described above in relation to the prior art.

This object is achieved according to the invention by a universal connector hose for joining a suction unit to a fume-guide element in a factory, which includes two flexible portions, connected to the suction unit and the fume-guide element respectively and a straight portion arranged between the two flexible portions, this portion being pivotally connected to the suction unit and to the fume-guide element, characterised in that the straight portion is axially extensible.

BRIEF DESCRIPTION OF THE DRAWINGS

In order better to understand the invention, a preferred embodiment thereof is described here purely by way of example, with the assistance of the appended drawings, in which:

FIG. 1 is a side view of a connector hose according to the invention;

FIG. 2 is an exploded view of a portion of the hose; and

FIG. 3 is a cross section of a detail of the hose on an enlarged scale.

DETAILED DESCRIPTION OF THE INVENTION

With reference to FIG. 1, a connector hose, generally indicated 5, is connected to a suction unit 6, driven by an electric motor, and to a fume-guide element 7 which acts as a hood. This latter is movable so it can be position directly over the point where the fumes are being generated. The suction unit 6 is normally positioned on a fixed support 8 while the hood, which is generally of plastics material, is frusto-conical with its axis inclined to the two parallel bases.

The hose 5 includes two flexible portions 9 and 11, the upper portion 9 being connected to the support 8 by means of a rolling element bearing 12 while the lower portion 11 is fixed to the upper rim of the hood 7 by means of a ring 13. The two flexible portions 9 and 11 are connected to each other by a third straight portion, generally indicated 14.

According to the invention, the straight portion 14 is formed by two rigid cylindrical tubes 16 and 17 and by an accordion-pleated or bellows tube 21 which is extendable to a determined length. The rigid tubes 16 and 17 are fixed to the two flexible portions 9 and 11 by two rings 18 and 19 (see also FIG. 2). The tube 21 is fixed in turn to the two rigid tubes 16 and 17 by two further rings 22 and 23, whereby the straight portion 14 of the hose 5 is made axially extensible.

The straight portion 14 also includes means 24 for ensuring that the rigid tubes 16 and 17, as well as the bellows tube 21, remain coaxial. The means 24 include a pair of rectilinear, prismatic guides 26 and 27 (FIG. 2) arranged along two substantially opposite generatrices of the tubes 16 and 17. The guides 26 and 27 are formed by two identical, substantially c-shaped sections, each fixed by one end to the upper rigid tube 16. In particular, these ends are fixed to a pair of supports 28 having a section which complements that of the guides 26 and 27. The two supports 28 are in turn fixed to the tube 16 by screws.

The means 24 also include two slides 29, having a shape similar to that of the supports 28, fixed by screws to the lower rigid tube 17. Each slide 29 is slidingly engaged by a corresponding guide 26, 27. A tension spring 31 is arranged inside the bellows tube 21 with its ends fixed to two screws, one each on the rigid tubes 16 and 17.

Inside each guide 26 and 27 is a friction disc 33 made of Teflon (trademark), only one of which is shown in FIGS. 2 and 3. The discs 33 are provided to counteract the action of the spring 31, whereby they normally prevent the guides 16, 17 from spontaneously sliding on their corresponding slide 29, in one direction under the action of the spring 31 and in the other under the action of gravity. Each disc 33 can be adjustably fixed along its axis by a knob 34 projecting outwardly from the guide 26, 27. Naturally, each slide 29 has travel end stops for its associated guide 26, 27.

The upper rigid tube 16 (FIG. 1) is fixed to the support 8 of the suction unit 6 by two opposite pairs of arms 37 and 38, only one of which is shown in FIG. 1. In particular, each arm 37 is fixed to a coupling sleeve 39 carried by the support 8, while each arm 38 is fixed to a ring 36 carried by the tube 16. The two arms 37 and 38 of each pair are pivotally connected to each other and frictionally restrained in known manner. The relative angular position of the two arms 37 and 38 determined the elbow bend of the flexible portion 9 of the hose 5.

In addition, a tension spring 41 is stretched between a clamp on the sleeve 39 and another on a further ring 40 carried by the rigid tube 16 to counterbalance the weight of the hose 5. The friction of the pivotal connections between the pairs of arms 37 and 38 is calibrated to prevent spontaneous rotation in one sense under the action of the spring 41 and in the opposite sense under the action of gravity.

The rigid tube 17 is fitted to the hood 7 by two opposing arms 42 (see FIG. 2) fixed to a ring 42 carried by the tube 17. The two arms 42 are pivoted on the two lugs 44 of a cross member 46. A support bracket 47 for the hood 7 is fixed to the member 46. The two arms 42 are also frictionally connected to the lugs 44, in known manner, so as to counteract the weight of the hood 7. The angular position of the arms 42 relative to the bracket 47 determines the elbow curve of the flexible portion 11 of the hose 5. The friction of the pivotal connections between the arms 42 and the lugs 44 is calibrated to prevent spontaneous rotation of the hood 7 under the action of gravity.

Finally, a support element 48 with a threaded housing is arranged on the lateral surface of the hood 7. A handle 49 for manual operation has a threaded pin for engaging the handle 49 in the housing in the support 48. The handle 49 is positioned substantially perpendicular to the base of the frusto-conical hood 7 so it can be manipulated easily by an operator.

The hood 7 can be moved by means of the handle 49 both vertically and about the axis of the support 8 of the suction unit 6. In addition, the handle 49 can be manipulated so as to move the hood 7 radially, so as to adjust the length of the straight portion 14 of the hose 5. The broken-line outline of FIG. 1 shows the position of the hose 5 when the bellows tube 21 is at its maximum extension.

The guides 26 and 27 maintain the two rigid tubes 16 and 17 coaxial. Therefore, by varying the curvature of the two flexible portions 9 and 11 of the hose 5, by means of the pivotal connections 36, 37 and 42, 47, the hood 7 may be moved always parallel to itself.

The advantages of the hose 5 of the invention over prior art hoses are clear from the above description. First of all, the hose 5 is genuinely universal, since the hood 7 can be positioned at any height within certain limits. In addition, the hose 5 can be used for sources of fumes or gas which in each horizontal plane may be arranged in any position within the two circumferences defined by the maximum and minimum extensions of the straight portion 14. Furthermore, thanks to the pivotal connection 42, 47, the hood 7 can always be placed in the best position so as to prevent fumes from being dispersed into the atmosphere.

It is clear that various modifications and improvements can be made to the hose as described without departing thereby from the scope of the claims. For example, the guides 26, 27 could be cylindrical rather than prismatic and there could be a different number of them from two. In addition, the straight portion 14 could be formed by two rigid tubes engaged so as to be telescopically slidable.

We claim:

1. A universal connector hose for joining a suction unit and a fume-guide hood for extracting fumes from a workplace, comprising two flexible portions pivotally connectable respectively to the suction unit and to the hood, and a straight portion disposed between the two flexible portions; wherein the straight portion further comprises two rigid tubes connected by an axially extensible bellows tube, and sliding means connecting the two rigid tubes to maintain the rigid tubes in coaxial relationship while permitting axial extension of the bellows tube.

2. A hose according to claim 1, wherein a pivotal connection between the hood and the rigid tube nearest to the hood includes a bracket fixed to the hood, and at least one arm fixed to the rigid tube and frictionally pivoting relative to the bracket.

3. A universal connector hose for joining a suction unit and a fume-guide for extracting fumes from a workplace, comprising two flexible portions connectable respectively to the suction unit and to the fume-guide, and a straight portion disposed between the two flexible portions, the straight portion being pivotally connected to the suction unit and the fume-guide; wherein the straight portion is axially extensible and comprises two rigid tubes connected by an extensible bellows tube, and wherein the rigid tubes are held in coaxial relationship by sliding means; the sliding means comprising a pair of rectilinear guides fixed to one of the rigid tubes, and a pair of slides fixed to the other of the rigid tubes, the slides being slidably engaged by the guides.

4. A hose according to claim 3, wherein the guides are arranged substantially along two diametrically opposite generatrices of the straight portion.

5. A hose according to claim 3, wherein the guides are prismatic in shape and are fixed to the one rigid tube by a pair of supports having a section identical to that of the slides.

6. A hose according to claim 3, wherein the rigid tubes are connected to each other by a tension spring, and adjustable friction means are provided between the guides and the slides.

7. A universal connector hose joining with a suction unit and a fume-guide hood for extracting fumes from a workplace, comprising a suction unit and a fume-guide hood, two flexible portions pivotally connected respectively to the suction unit and to the hood, and a straight portion disposed between the two flexible portions; wherein the straight portion further comprises two rigid tubes connected by an axially extensible bellows tube, and sliding means connecting the two rigid tubes to maintain the rigid tubes in coaxial relationship while permitting axial extension of the bellows tube.

8. The hose of claim 7, wherein the sliding means comprise a pair of rectilinear guides fixed to one of the rigid tubes, and a pair of slides fixed to the other of the rigid tubes, the slides being slidably engaged by the guides.

9. The hose of claim 7, wherein the guides are arranged substantially along two diametrically opposite generatrices of the straight portion.

10. The hose of claim 7, wherein the guides are prismatic in shape and are fixed to the one rigid tube by a pair of supports having a section identical to that of the slides.

11. The hose of claim 7, wherein the rigid tubes are connected to each other by a tension spring, and adjustable friction means are provided between the guides and the slides.

12. The hose of claim 7, wherein a pivotal connection between the fume-guide hood and the rigid tube nearest to the hood includes a bracket fixed to the hood, and at least one arm fixed to the rigid tube and frictionally pivoting relative to the bracket.

* * * * *